United States Patent Office 2,932,849
Patented Apr. 19, 1960

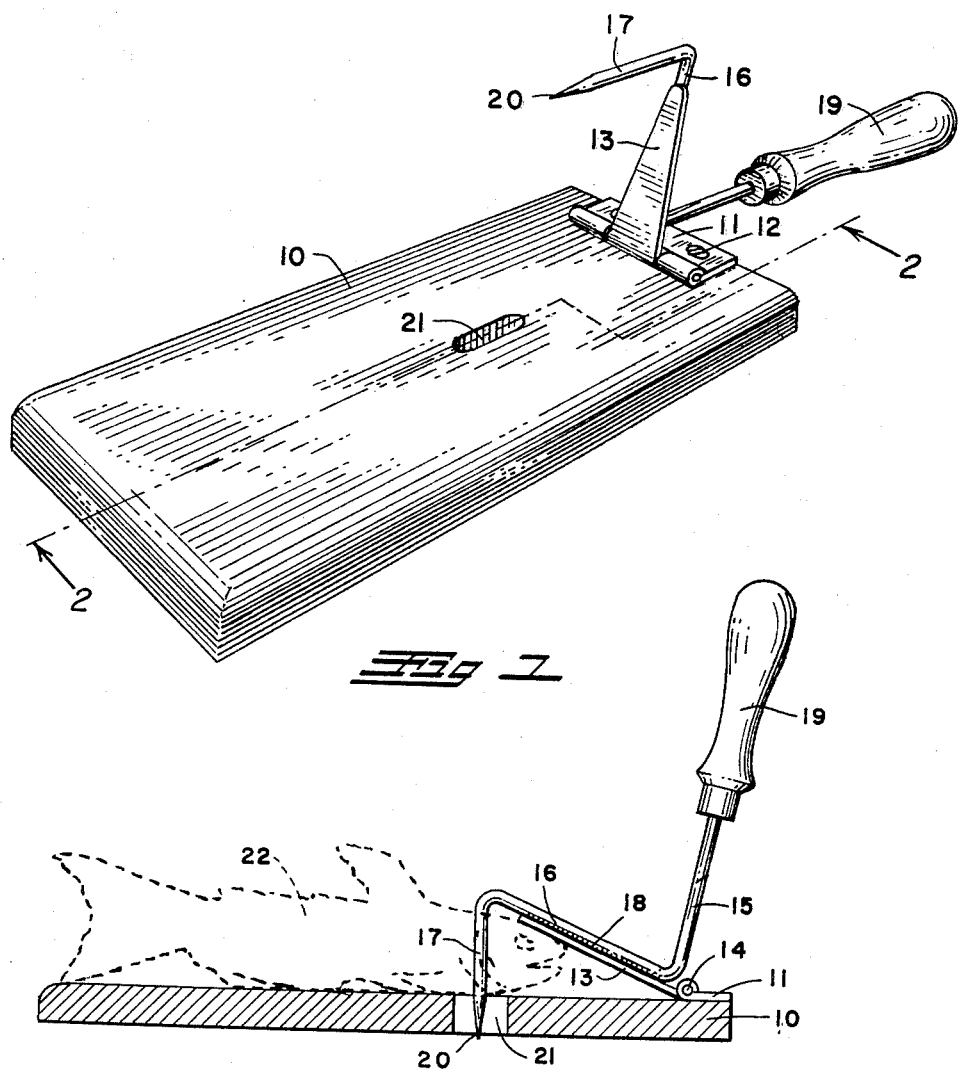

2,932,849

FISH SKINNING AND CLEANING BOARD

Glenn E. Missman, Boise, Idaho

Application August 11, 1958, Serial No. 754,199

1 Claim. (Cl. 17—8)

This invention relates to what might be termed a fish cleaning board, that is, a device for holding a fish so that it may be readily skinned and the edible portions quickly and easily removed and the remainder discarded.

The principal object of the invention is to provide a board with an easily operated, highly efficient and economical means for supporting a fish in the natural swimming position so that it can be quickly and easily skinned and the edible portions or filets rapidly removed with the head, backbone, tail and entrails being retained upon the board so that they may be discarded in their entirety.

Other objects and advantages resides in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of the improved fish dressing board in the open position ready to receive a fish; and Fig. 2 is a longitudinal section therethrough taken on the line 2—2, Fig. 1, illustrating the board in the fish holding position with the position of a typical fish indicated in broken line.

The invention comprises a flat, elongated board 10. In the embodiment illustrated, the board 10 is formed from wood and is provided with rounded side edges and a similarly rounded front edge. A hinge plate 11 is secured to the upper face of the board 10 parallel to the rear edge thereof by means of suitable attachment screws 12. A medially positioned hinge leaf 13 is hinged to the hinge plate 11 upon a hinge pin 14 so that it may be swung downwardly toward the board 10 or upwardly therefrom.

A rod 16 is mounted on or attached to the hinge leaf 13 in any desired manner. One extremity of the rod is turned upwardly adjacent the hinge pin 14 to form a handle portion 15 and the other extremity is turned downwardly over the free extremity of the hinge plate 18 to form a point portion 17. The handle portion 15 and the point portion 17 each form an acute angle with the rod 16, as shown in Fig. 2. As illustrated, the rod is welded or braized as shown at 18 along the center line of the hinge leaf 13. While the braizing or welding of a continuous bent rod to the hinge leaf has been found to be an efficient way to manufacture the device, it is conceivable that the rod and the hinge leaf could be formed as a complete unitary element if preferred.

The handle portion 15 is provided with a suitable hand grip 19 and the point portion 17 is provided with a sharpened point 20 which, when the hand grip 19 is swung upwardly as shown in Fig. 2, enters a receiving opening 21 formed in the board 10.

For skinning fish, such as catfish, the fish is placed medially and longitudinally of the board in an upright position with the head extending forwardly beyond the opening 21. The hand grip 19 is then swung upwardly to cause the point portion 17 to be forced downwardly through the fish's body rearwardly of the head thereof, as shown in Fig. 2, to securely support the fish in an upright position. An incision is made at each side of the body rearwardly of the head and longitudinally along the spine. The skin at the two sides of the body is then gripped and pealed rearwardly. The backbone is then cut and raised up and pulled off leaving the head and entrails on the board to be discarded.

The board can be also used for fileting fish. The fish is attached to the board as above described by swinging the handle upwardly so that the pointed portion 17 will enter the fish rearwardly of the head. With a sharp knife a deep incision is made into the fish at a point just back of the gills and at each side. The cut should be made no deeper than the spine and only through the skin at the belly of the fish. The skin is then peeled from the incisions toward the tail at each side. The knife is then inserted downwardly through the fish at one side of the backbone at the head incision and drawn rearwardly, in contact with the board, the entire length of the fish cutting the ribs alongside the spine to separate a filet. The cut is then repeated at the other side of the backbone to separate the filet at the other side. The remainder of the fish can be discarded by holding the board over the desired receiver and then releasing the pointed extremity by swinging the handle portion.

The bones can be quickly removed from the filets by inserting knife under the spine extremities of the ribs and peeling them from the fish.

While a specific form of the improvement has been described and illustrated herein, it is to be understood that the same may be varied within the scope of the appended claim, without departing from the spirit of the invention.

Having thus described the invention, what is claimed and desired secured by Letters Patent is:

Means for holding a fish for cleaning purposes comprising: an elongated flat board; a hinge plate mounted on the upper surface of said board adjacent the rear extremity thereof; a hinge leaf; a hinge pin mounted in said hinge plate and positioned parallel to the plane of said board and at right angles to the longitudinal axis of said board and hingedly securing the rear extremity of said hinge leaf to said hinge plate; a rod fixedly mounted on and extending medially of said hinge leaf; a point portion formed on and extending downwardly from the forward extremity of said rod; and a handle portion formed on and extending upwardly from the rear extremity of said rod so that forward movement of said handle portion will cause a downward movement of said point portion to cause the latter to impale a fish on said board.

References Cited in the file of this patent

UNITED STATES PATENTS

| | | |
|---|---|---|
| 1,132,417 | Alexander | Mar. 16, 1915 |
| 1,874,898 | Casse | Aug. 30, 1932 |
| 2,523,736 | Swetlik | Sept. 26, 1950 |
| 2,611,252 | Griffin | Sept. 23, 1952 |